(No Model.)
L. E. WHITON.
LATHE CHUCK.
No. 551,426. Patented Dec. 17, 1895.
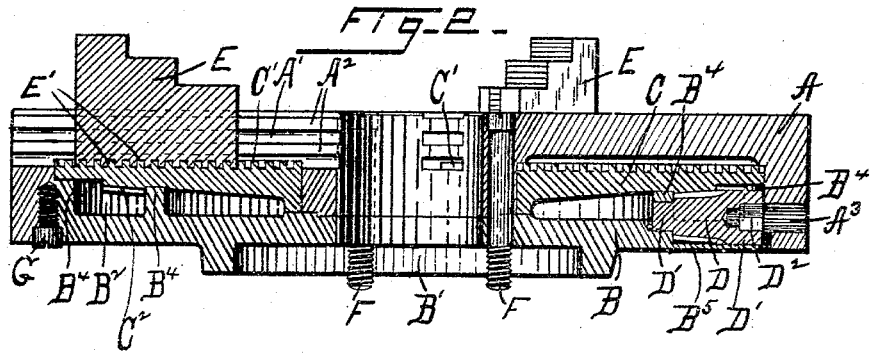
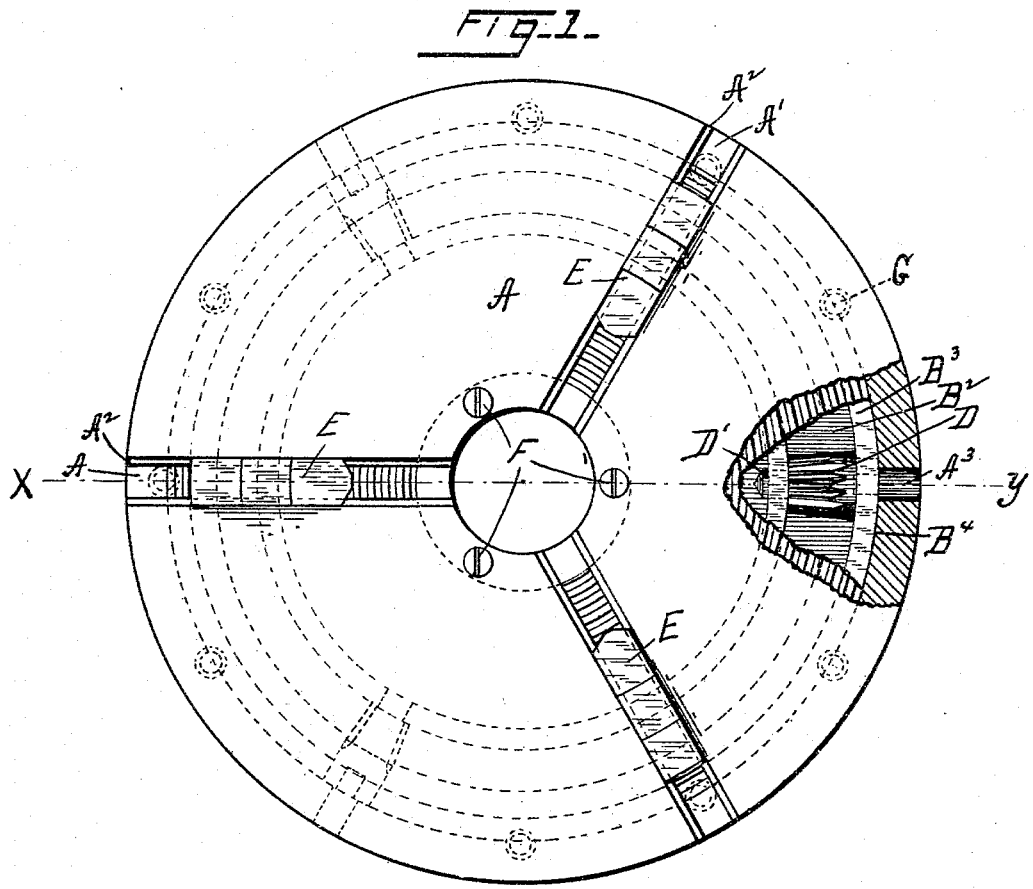
WITNESSES:
INVENTOR
Lucius E. Whiton
BY
Frank H. Allen
ATTORNEY

UNITED STATES PATENT OFFICE.

LUCIUS E. WHITON, OF NEW LONDON, CONNECTICUT.

LATHE-CHUCK.

SPECIFICATION forming part of Letters Patent No. 551,426, dated December 17, 1895.

Application filed September 28, 1894. Serial No. 524,417. (No model.)

*To all whom it may concern:*

Be it known that I, LUCIUS E. WHITON, a citizen of the United States, residing in the city and county of New London and State of Connecticut, have invented a new and useful Improvement in Lathe-Chucks, of which the following is a specification, reference being had to the accompanying drawings.

My invention relates to geared scroll-chucks in which the jaws are moved radially by a revoluble scroll-plate so mounted within the chuck that its scroll-thread is in engagement with teeth cut upon the sliding jaws. Said scroll-plate is also provided with a series of gear-teeth, and is caused to revolve by pinions (of which there may be one or more) so mounted within the chuck as to mesh with said gear-teeth, and which may be operated by any convenient key.

The objects of my invention are, first, to provide an improved method of mounting the said pinions, which shall reduce the expense of constructing both the pinions and their bearings and, at the same time, increase the durability of the parts, and, second, to improve and strengthen the method of fitting the radially-moving jaws whereby greater accuracy and durability may be secured. I accomplish these objects in the manner hereinafter described, and illustrated in the accompanying drawings, in which—

Figure 1 is a face view of a chuck embodying my improvements, so broken away as to expose one of the pinions and the recess within which it is mounted. Fig. 2 is a central cross-section of the chuck, taken on the line $x\ y$ of Fig. 1.

In the drawings, A represents the frame or body of the chuck. It is provided with radial slots A', in which the jaws E slide, said slots being provided with retaining-ribs $A^2$, and the jaws being formed with scroll-teeth E' upon their inner faces. The frame A is also provided with a series of holes $A^3$, through which the key is inserted into the pinions when the chuck is to be operated. The part B is the back plate of the chuck, within which are mounted the pinions D, as hereinafter described, and which serves to close the opening in the frame A of the chuck, and to hold the scroll C in its proper position.

In the chuck shown the plate B is provided with a recess B', to which the lathe face-plate is designed to be fitted, and which serves to mount the chuck centrally upon the lathe-spindle. In chucks of smaller diameter the recess B' is usually relatively enlarged and is often made to extend into the frame A, as shown in Letters Patent No. 422,480, dated March 4, 1890. The inner face of plate B is provided with an annular groove $B^2$ between walls $B^4$, as shown. When assembled, the scroll C abuts against and turns freely upon surfaces $B^3$. The scroll-plate C is revolubly mounted within the frame A, and is provided with scroll-thread C' and bevel-gear ring $C^2$. D represents a beveled pinion provided with journal-bearings D', and having in one end a central prismatic recess $D^2$ for the reception of the end of the key, which is inserted through the hole $A^3$, as above described.

The advantage of my improved method of mounting the pinions D will appear from a description of the method of manufacture, which is as follows: The frame A and back plate B having been properly fitted together, the holes $A^3$, through which the chuck-key is afterward inserted, are drilled in a radial direction at the proper point and are prolonged through the walls $B^4$ of the back plate B. In the bottom of the annular recess $B^2$ of back plate B are a series of approximately semicircular recesses $B^5$, within which the pinions D are to be located, and the holes $A^3$ are so drilled as to be approximately in the centers of these recesses. The back plate B is now removed from the chuck, and the holes $A^3$ are enlarged through the outer wall $B^4$ of the back plate sufficiently to receive the pinions D, as shown, which are then permanently mounted in journal-bearings within the back plate B. Upon assembling the chuck, pinions D will be central with the openings $A^3$ through the chuck-frame, and may be revolved by inserting through these openings a key having a prismatic end corresponding to the recess $D^2$. They will be retained in position in one direction by abutment against the annular wall $B^4$ of the back plate, and will be prevented from movement in the opposite direction by the abutment of their ends against the inner wall of the frame A. It is thus unnecessary to provide any separate device for retaining the pinions D in the proper position, which is a saving of much importance in the manufacture, both on account of the simpler form of the pinions and fewer processes necessary in finishing the bearings within which they are mounted.

Referring to the second object of my invention above mentioned, it has been found in practice that the radial slots in which the jaws slide are subject to much wear and excessive strain, resulting in occasional breakage when the jaws are fitted in the ordinary manner. To furnish largely-increased strength and area of wearing-surface I provide the walls of the radial slots A' with four retaining ribs $A^2$, and mill corresponding grooves in the sides of the jaws E, as shown. These retaining-ribs $A^2$ resist the strains received by the jaws E more perfectly than in previous forms of construction and afford very marked advantages, as will be readily understood. While I am aware that slots with four retaining-ribs have been used heretofore in connection with separable jaws in which the upper section of the jaw is independently movable, as shown in Letters Patent No. 136,349, yet I am not aware that such retaining-ribs have been provided in geared scroll-chucks having solid jaws, for the purpose of increasing the strength and durability of the chuck.

The frame A and back plate B are secured together by a series of screws G, in the joint, as shown, and are further secured by the central bolts F, which serve to attach the chuck to the face-plate, mounted within recess B'.

Having described my invention, what I claim as new, and desire to secure by Letters Patent, is—

1. In a geared scroll chuck, the combination of the frame (A) provided with a series of radial apertures for the reception of an operating key, back plate (B) provided with a series of pinion bearings, and a series of pinions, having central prismatic recesses in their outer ends, mounted wholly in said back plate within said bearings, so arranged that when assembled said pinions may be revolved by a suitable key inserted through said apertures in frame (A), substantially as described.

2. In a geared scroll chuck, the combination, with the chuck body having a series of radial slots provided with guiding ribs, a back plate provided with an annular recess on one surface near the periphery, whereby two annular walls are formed, the body and the walls being provided with registering apertures, pinions in the apertures of the walls, and a scroll plate between the body and the back plate, one face of which is provided with a scroll and the other face is provided with a gear ring in engagement with the pinions, and jaws in said slots provided with guiding grooves, substantially as set forth.

LUCIUS E. WHITON.

Witnesses:
D. E. WHITON,
FRANK H. ALLEN.